(12) United States Patent
Dreisbach et al.

(10) Patent No.: US 6,345,847 B1
(45) Date of Patent: Feb. 12, 2002

(54) SECURITY SEAL AND LOCK

(75) Inventors: Richard C. Dreisbach; Carlos M. Pinho, both of North Arlington, NJ (US); Terrence Brammall, Angola; Craig B. Hamilton, Waterloo, both of IN (US)

(73) Assignee: E.J. Brooks Company, Livingston, NJ (US)

( * ) Notice: Subject to any disclaimer, the term of this patent is extended or adjusted under 35 U.S.C. 154(b) by 0 days.

(21) Appl. No.: 09/474,165

(22) Filed: Dec. 29, 1999

(51) Int. Cl.[7] ............................................. B65D 33/34
(52) U.S. Cl. ..................... 292/323; 292/252; 292/307 R
(58) Field of Search .................. 292/315, 323, 292/307 R, 318–321, 252

(56) References Cited

U.S. PATENT DOCUMENTS

| | | | | |
|---|---|---|---|---|
| 4,640,538 A | * | 2/1987 | Brammall | 292/323 |
| 5,222,776 A | * | 6/1993 | Georopoulos et al. | 292/323 |
| 5,352,003 A | * | 10/1994 | Bystry | 292/323 |
| 5,647,620 A | * | 7/1997 | Kuenzel | 292/317 |
| 5,820,176 A | * | 10/1998 | Leon et al. | 292/323 |
| 6,155,617 A | * | 12/2000 | Kuenzel | 292/318 |

* cited by examiner

Primary Examiner—Teri Pham Luu
(74) Attorney, Agent, or Firm—Carella, Byrne, Bain, Gilfillan; John G. Gilfillan III; William Squire

(57) ABSTRACT

A seal and lock mechanism employs a cable and a mechanism for securing a free end of the cable to the seal by a wedging action within a tapered housing bore employing wedging means such as balls and the like. The wedging action is enhanced by roughening the surface of the wedging means or otherwise improving their resistance to displacement with respect to the surface of the cable.

5 Claims, 4 Drawing Sheets

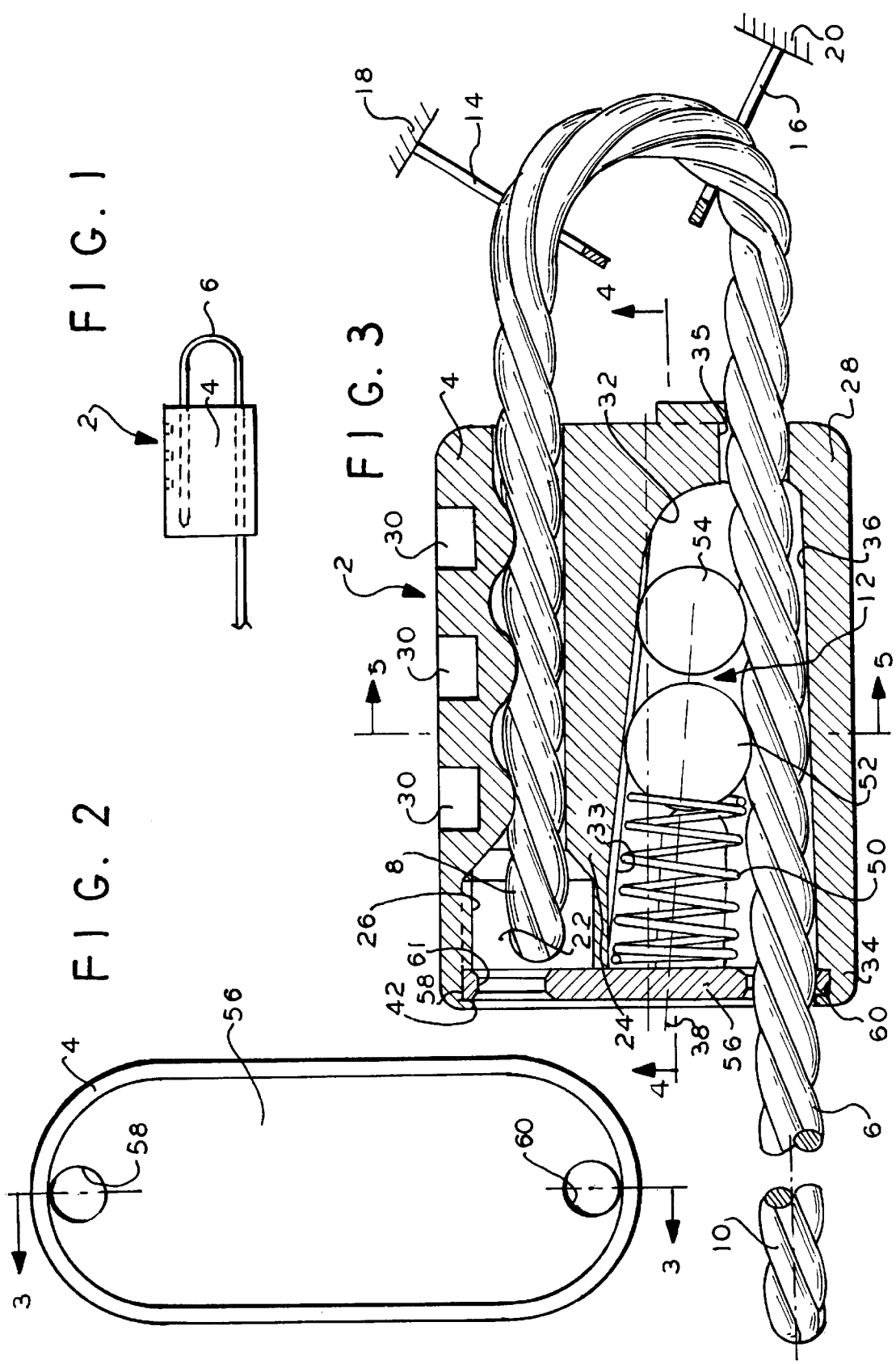

SECURITY SEAL AND LOCK

This invention relates to security seals, and more particularly, to a seal and lock employing a cable and a mechanism for securing a free end of the cable to the seal by a wedging action within a tapered housing bore employing balls and the like.

Of interest is commonly owned U.S. Pat. No. 5,222,776, incorporated by reference herein, which discloses a security seal and lock of which the present invention is an improvement. In this patent, a housing has a path for receiving a cable free end to be secured to the housing, the other cable end also being secured to the housing. A tapered cavity is in the housing through which the path passes. The path is defined by cable entrance and exit holes in the housing and a channel in the cavity. A pair of balls are in the cavity and are biased by a spring toward the entrance hole and the small transverse dimension of the cavity.

The path is such that it is intercepted by the balls which are used for locking the cable to the housing to preclude withdrawal of the cable. The entrance hole is offset from the exit hole transversely to the general cable insertion direction. The balls and the offset holes provide a path for the cable during insertion which path is inclined relative to the General insertion direction. In practice, insertion of the cable along the path through the housing is required to lock the cable free end to the housing. Withdrawal of the inserted free end is precluded by the balls jamming against the inserted cable.

Also of interest is commonly owned U.S. Pat. No. 5.820.176, incorporated by reference herein, which discloses a security seal and lock of which the present invention also is an improvement. The invention of the '176 patent comprises a housing having a longitudinally extending bore with opposing first and second ends, at least the second end being in communication with the ambient about the housing through an aperture in the housing, the bore having a transverse dimension that decreases in direction from the first end to the second end. The housing has a channel of a transverse width in communication with and along the bore and forming a continuous path with the aperture. A first ball in the bore has a diameter smaller than the bore transverse dimension adjacent to the first end and larger than the bore transverse dimension adjacent to the second end. Bias means are in the bore at the first end for biasing the ball towards the second end. An elongated circular cylindrical flexible member is included having a free end for insertion into the bore at the second end through the aperture, the channel having a depth of at least 30% of the diameter of the elongated member. The bias means, bore, ball and elongated member are arranged such that a force on the elongated member to withdraw the cable free end from the housing bore toward the second end wedges the ball to the elongated member to the housing in the bore. Thus, the channel guides the elongated member, preferably a stranded cable having a nominal diameter of about 1/16 inches or less, during insertion, provides a path for the member, decreases the degree of interference between the ball and the member during insertion and contributes to reducing the insertion load on the member.

The present inventors have found that although the prior designs are perfectly acceptable for cable sizes of a diameter of 1/16 inches or less, they may experience difficulty with cables having a diameter in excess of 1/16 inches or more. The larger cables have been found to be difficult to clamp. This resulted from an inadequate locking cooperation between the cable, the balls and the housing.

SUMMARY OF THE INVENTION

It is an object of the present invention to provide a security seal and lock which generates improved clamping between the lock housing and the locking cable.

Another object of the present invention is to provide a security seal and lock which is operable for use with locking cable having a diameter in excess of 1/16 inches.

These objects and others are achieved by the security seal and lock of the present invention as to which the clamping and locking of the stranded cable within the housing is enhanced by increasing the frictional forces between the cable and the balls. In one aspect of the invention, the balls are provided with a rough surface finish as distinguished from the smooth polished surface finishes which have been known and practiced in the art. A second aspect of the invention contemplates coating the balls with a soft plastic to act as a friction generating surface. The invention also contemplates having the balls engage the housing in substantially a multi-point contact such as to enhance the clamping forces thus reducing the ability of the balls to rotate, which rotation might permit defeating the seal.

THE DRAWINGS

A more complete understanding of the present invention may be had from the following detailed description, particularly when read in light of the accompanying drawings, wherein:

FIG. 1 is a side elevational view of a seal and lock according to an embodiment of the present invention;

FIG. 2 is a front end view of the seal of FIG. 1;

FIG. 3 is a cross sectional view of the seal of FIG. 2 taken through the plane 3—3;

DETAILED DESCRIPTION

Figure 4:
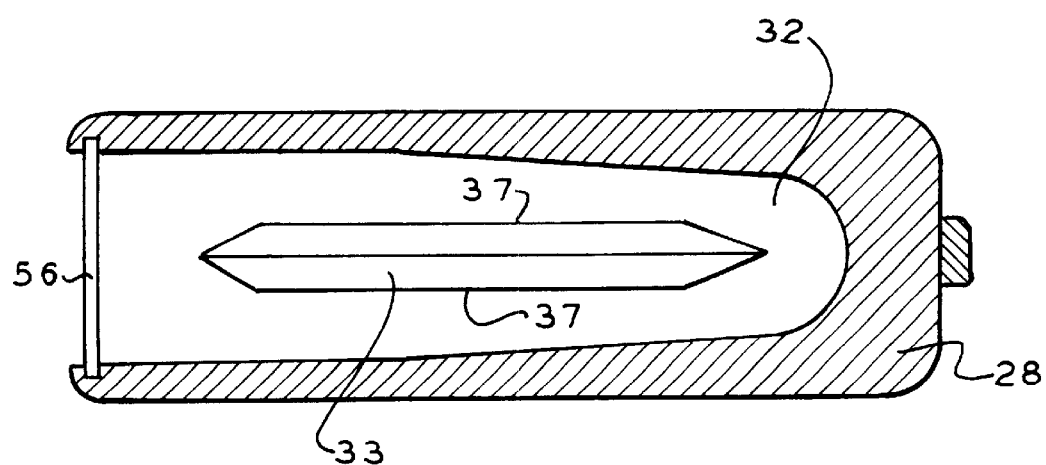
FIG. 4 is a cross sectional view through the plane 4—4 of FIG. 3.

Referring now to FIG. 1, a security seal and lock according to the invention is shown and designated generally by the reference numeral 2.

Seal and lock 2 comprises a preferably metal housing 4, preferably cast zinc, and a stranded shackle cable 6, preferably of metal such as steel. The term "cable" as used in this detailed description and in the claims includes stranded or solid shackle cables made of metal or other suitable material. The cable for this preferred embodiment is a stranded cable having a nominal diameter in excess of 1/16 inches (1.6 mm). Cable 6 has a first end 8 secured permanently to and internally of the housing such as by swaging. The other end of cable 6, second end 10, is inserted into the housing to be locked therein by the locking mechanism designated generally by the reference numeral 12 (FIG. 3). In use, the second cable end 10 is passed through one or more hasps 14, 16 for securing and/or locking respective structures 18 and 20.

Housing 4. FIG. 3, has a chamber 22 for receiving the cable 6. Formed in chamber 22 of housing 4 is a boss 24 having a first bore 26 or conduit formed therein for receiving the first end 8 of cable 6 therethrough. Bore 26 is normally linear prior to and during the insertion of cable 6 therethrough. First bore 26 extends fully through boss 24 to accommodate the insertion of cable 6 from outside the housing through the boss and into the housing. In use, the first cable end 8 is passed through bore 26 into chamber 22. With the cable so positioned, it is secured within first bore 26 by swaging using, a typical swaging tool thereby forming swaged depressions 30 in the housing. Depressions 30 give a user visual evidence that the lock/seal has been secured and the cable firmly locked therein.

Also formed in the housing is a generally conical second bore 32 (FIGS. 3 and 4). The bore 32 has its largest diameter adjacent to the distal end 34 of housing 4 and its smallest diameter adjacent the proximal end wall 28 of housing 4. Formed in proximal end wall 28 is an aperture 35 which accommodates passage of cable 6 from outside the housing 4 into the second bore 32. A first channel 36 is formed in the bottom of second bore as seen in FIG. 3. Channel 36 extends substantially the full length of second bore 32 and is shaped and dimensioned to be able to receive as much as 50% of the diameter of cable 6 therein.

Conical bore 32 preferably has a 3° taper along its length relative to its major axis 38 so that the bore conical angle is 6°. First channel 36 slopes downwardly in the bottom of bore with respect to the major axis 38 of bore 32 from the proximal end 28 to the distal end 34 of housing 4.

The distal end 34 of housing 4 is generally open. However, for the reasons described below, it is provided with a closure 56 comprising a plate having spaced openings 58 and 60 formed therein. Closure 56 is received in channel 61 formed in the distal end 34 of housing 4 and is secured thereon by bending the edge 42 of housing 4 around the perimeter of closure 56.

Figure 5:
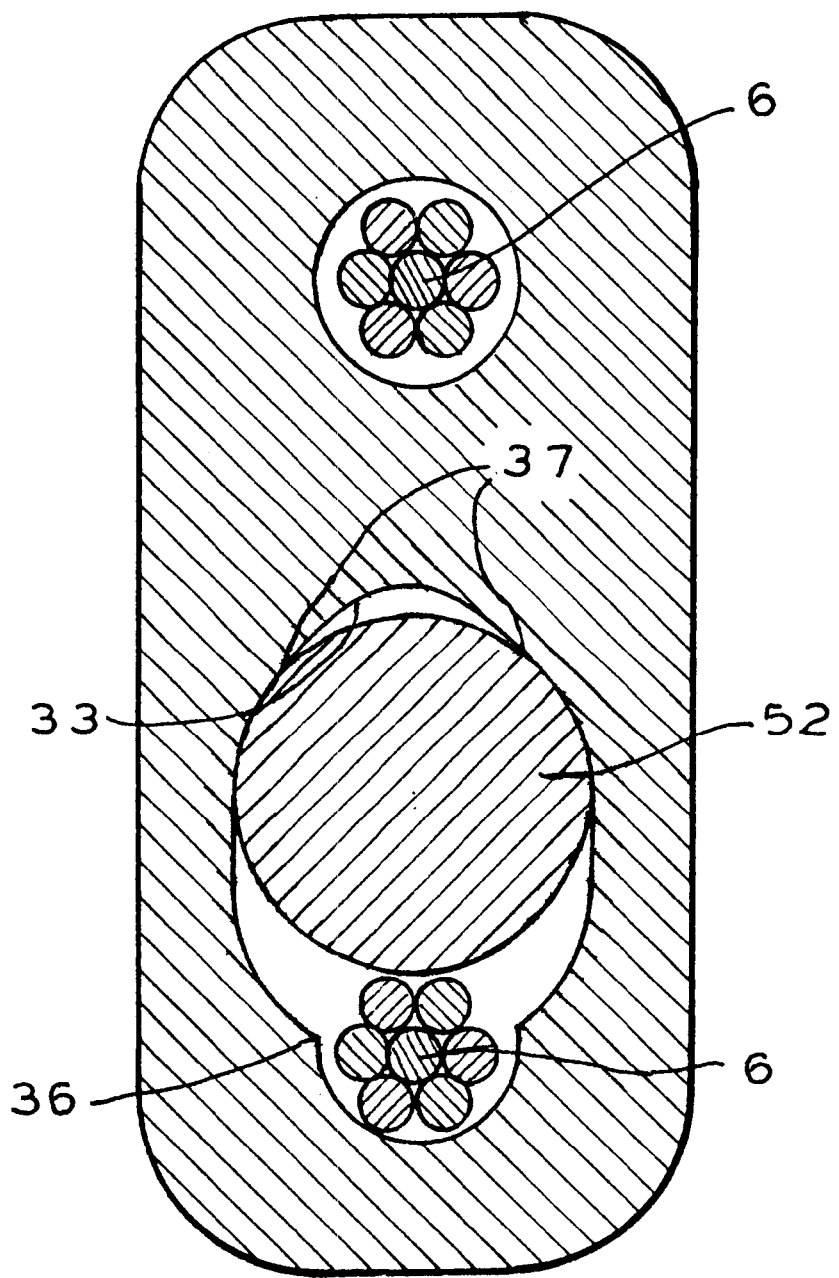
FIG. 5 is a cross-sectional view through the plane 5—5 of FIG. 3.

As best may be seen in FIGS. 4 and 5, bore 32 has an inverted V-shaped groove formed therein which defines a second channel 33 therein. As is discussed in greater detail hereinafter, V-shaped channel 33 defines edge surfaces 37 for cooperating with securing balls 52, 54 so as to establish multi-point contact between the housing 4 and the cable 6 during locking. This multi-point locking, contact generates locking forces which inhibit rotation of the balls in either the clockwise or counter-clockwise directions as seen in FIG. 5. Such inhibition resists any tendency of cable 6 to be rotated within housing 4, which rotation often occurs during attempts to defeat the seal. The multi-point locking contact is particularly effective with respect to larger diameter cable, e.g. Cable having an effective diameter in excess of 1/16 inch.

The locking balls 52, 54 are of differing diameters such that they each can engage the edges of groove 33 of bore 32 and the surface of cable 6 at the same time.

Disposed between ball 52 and closure 56 is a spring 50 which biases the ball 52 toward the smaller end of conical bore 32 such as to tend to hold the ball 52 in contact with V-shaped groove 33 and cable 6. Spring 50 may be a coil spring as shown, or any other form of known biasing means which can perform the desired function of urging ball 52 toward the smaller end of conical second bore 32. Balls 52, 54 are preferably steel balls which are provided with a roughened surface. In this regard, it has been found that a ball surface roughened to fifty (50) microfinish or more provides resistance to movement between the balls and the cable such as to improve locking and resistance to removal for purposes of defeating the seal.

In operation, with the first end of cable 6 secured by swaging in first bore 26, the free second end 10 of cable 6 is passed through the hasps 14 and 16 (FIG. 3). Free end 10 is then inserted into aperture 35 at proximal wall 28. The cable immediately then enters first channel 36. As the cable 6 advances along the channel path, it engages the underside of first securing ball 54. At least 50% of the diameter of cable 6 extends upwardly out of first channel 36, as a result continued advance of the cable tends to lift the ball 54 out of the channel and toward the distal end 34 of the housing and to depress the cable downwardly into first channel 36. This movement of ball 54 continues until its displacement is such as to permit the cable 6 to pass along the channel 36 and under ball 54 substantially unimpeded.

Continued passage of cable 6 in channel 36 causes the second end 10 of the cable 6 to engage the underside of second securing ball 52 in the same manner. Thus, ball 52 also is caused to be displaced upwardly out of first channel 36 and toward the distal end 34 of the housing 4. Such movement of ball 54, however, is against the bias of coil spring 50. Continued passage of cable 6 along channel 36 permits the passage of second end 10 through aperture 60 and out of the housing 4 to establish the desired sealing relationship.

Because of the conical shape of bore 32, the diameter of balls 52 and 54, and the slope of channel 36 down to the left as seen in FIG. 3, the insertion passage of cable 6 through the housing 4 is resisted substantially only by the force of spring 50 acting against ball 52. This force is not significant. Just the opposite occurs upon an attempt to withdraw the cable 6 from the housing, i.e. an attempt to displace cable 6 from left to right as seen in FIG. 3.

Considering the locking of cable 6 against withdrawal, it best can be seen in FIG. 3 that movement of cable 6 from left to right, as would occur during withdrawal, causes balls 52 and 54 to be displaced to the right. As the rightward displacement continues, and because of the decreasing diameter of bore 32 from left to right, balls 52 and 54 are also displaced downwardly against cable 6. Such downward displacement forces cable 6 to be crushed into channel 36 such that at some point the crushing force is sufficient to preclude further movement of cable 6. It is locked in position and cannot move. In this regard, the balls are initially engaged between cable 6 and second channel 33 at three or four points, i.e. at the edges 37 of channel 33 and either on one or two strands of the cable 6. To the extent that the locking forces are sufficient to cause crushing of the cable, the loci of the points of engagement between the balls and the cable can only be adequately described as plural. Once cable 6 is inserted into the housing and through channel 36, the only way to free the seal and lock 2 from hasps 14 and 16 is to cut the cable 6.

As noted above, one aspect of the present invention contemplates providing balls 52, 54 with a roughened surface. Such a roughened surface provides two advantages in support of the locking and sealing function of the device. First, it resists sliding of cable 6 with respect to the surface of the balls 52, 54. Secondly, it resists sliding of balls 52, 54 with respect to the edges 37 of second channel 33. Thus, the roughened surface resists the sliding of balls 52, 54 on the edges of second channel 33 which otherwise would permit rolling of balls 52, 54 in response to rotational displacement of cable 6 which, of course, might defeat the seal.

As an alternative to roughing the ball surfaces, it has been found that coating the balls with a polymer improves the resistance to movement between the balls and the edges of second channel 33, as well as between the balls and the cable. It is recognized that such plastic material may be caused to strip from the ball surface. However, for lighter applications the plastic coating has been found to be effective.

Figure 6:
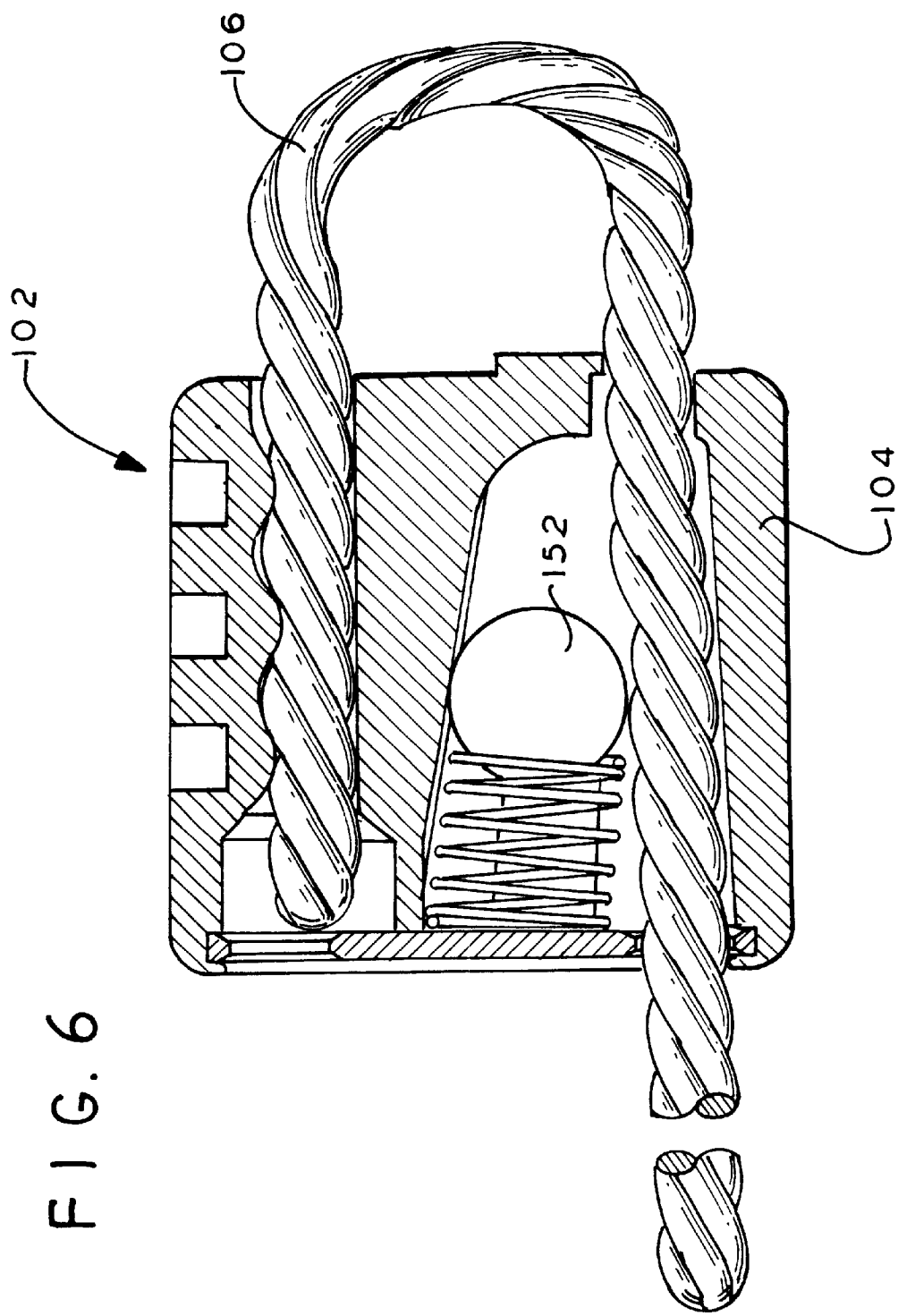
FIG. 6 is a cross-sectional view similar to the view of FIG. 3 but of a second embodiment of the invention.

Referring now to FIG. 6, there is shown a security lock and seal in accordance with a second embodiment of the invention, designated generally by the reference numeral 102.

Seal and lock 102 is substantially identical to the seal and lock of FIGS. 1–5 with the exception that it utilizes a single ball 152 to effect locking and securing of the cable 106.

Security locks and seals using only a single ball are appropriate for use in light load situations. The ball 152 is provided with a gripping surface using either roughing or plastic coating to achieve the desired resistance to slippage. The operation of seal and lock 102 is the same as that as described with respect to seal and lock 2 of FIGS. 1–5.

What has been described in the detailed description is a preferred embodiment of the invention. It will be recognized that various departures from the preferred embodiment can be made without departing from the spirit and scope of the invention.

What is claimed is:

1. A seal comprising:

a housing having opposing first and second ends;

a first bore extending longitudinally into said housing from said second end;

a second bore, transversely spaced from said first bore, said first and second bores being in communication with the ambient about the housing through apertures formed in the second end of the housing;

a wall disposed in said housing, said wall defining said second bore such that the second bore has transverse dimensions which decrease in value in a direction from said first end to said second end of said housing;

a first channel formed in the surface of said second bore, said first channel extending from a first aperture formed in said second end of said housing longitudinally along the length of said housing;

a second channel formed in the surface of said second bore generally opposite said first channel, said second channel defining edges along its intersection with said second bore, said second channel having a transverse dimension;

at least one ball disposed in said second bore, said one ball having a diameter smaller than the second bore transverse dimension adjacent said first end and larger than said second bore transverse dimension adjacent to said second end, said ball having a diameter larger than the transverse dimensions of each of said first and second channels;

an elongated flexible member having a first end for insertion into said first bore through a second aperture at said second end of said housing, and a second end for insertion into and through said first aperture in said second end of said housing, along said first channel and out of said housing through an opening in said housing at the end thereof opposite said first aperture; and wherein said second bore, said ball and said elongated member are relatively arranged such that a force on said elongated member tending, to withdraw said elongated member second end from the housing through the second end of the housing causes the ball to wedge against the elongated member and said edges of said second channel whereby to lock the elongated member within the housing.

2. The seal of claim 1 and further including a second ball disposed in said second bore, said second ball having a diameter smaller than said second bore transverse dimension adjacent to said first end and larger than said bore transverse dimension adjacent to said second end, said second ball being, smaller in diameter than the diameter of said first ball and disposed between said first ball and said second end of said housing, said second ball having a diameter larger than the transverse dimensions of each of said first and second channels.

3. The seal of claim 2 wherein the balls are formed with a rough surface having roughness in the range of at least fifty (50) microfinish.

4. The seal of claim 2 wherein the elongated member is a cable comprising stranded metal and has a first end secured to the housing.

5. The seal of claim 2 wherein said first channel extends for substantially the entire length of said second bore.

\* \* \* \* \*